Jan. 6, 1959
C. P. BARRON
2,867,259
TRACTION ATTACHMENT FOR VEHICLE WHEELS
Filed Sept. 3, 1957
FIG. 1.
FIG. 2.
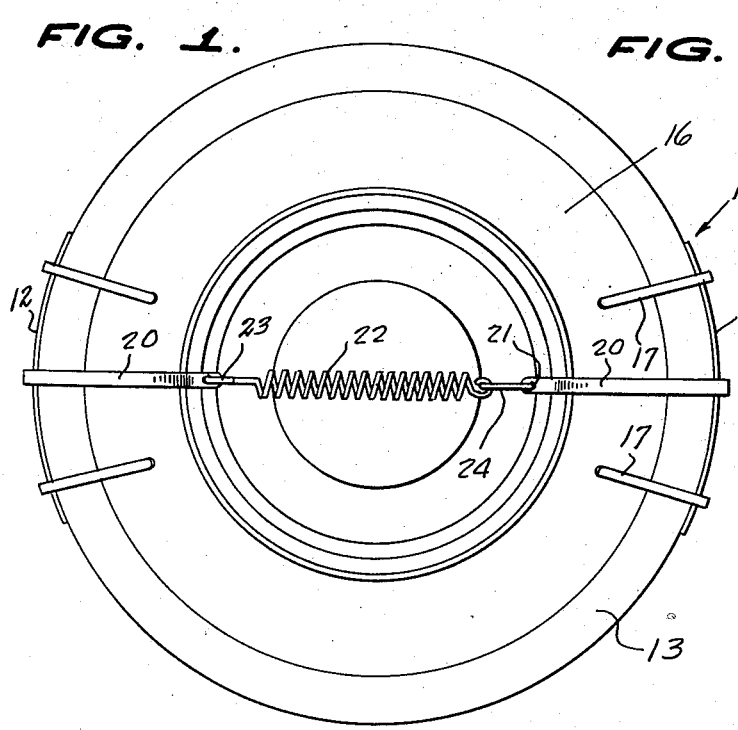
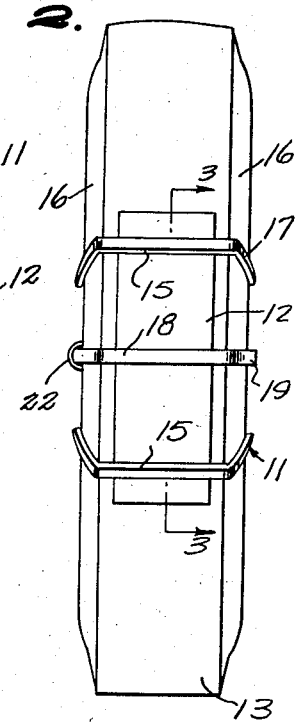
FIG. 3.
FIG. 4.
FIG. 5.
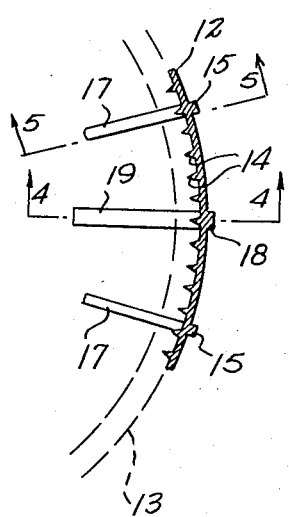
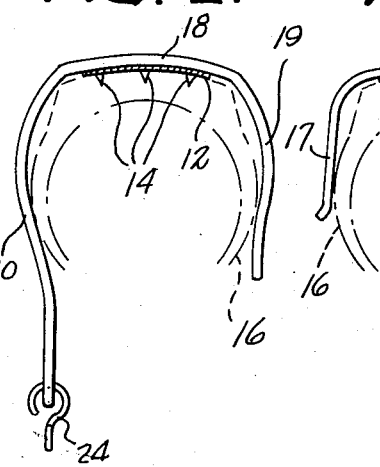
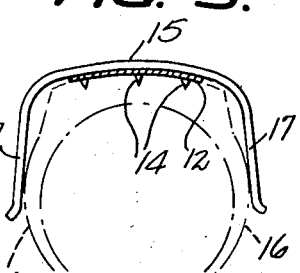
INVENTOR.
CHARLES P. BARRON,
BY
McMorrow, Berman & Davidson
ATTORNEYS.

United States Patent Office 2,867,259
Patented Jan. 6, 1959

2,867,259

TRACTION ATTACHMENT FOR VEHICLE WHEELS

Charles P. Barron, Superior, Wis.

Application September 3, 1957, Serial No. 681,747

3 Claims. (Cl. 152—225)

This invention relates to anti-skid attachments for vehicle wheels, and more particularly to an anti-skid device suitable for attachment to a resilient vehicle tire.

A main object of the invention is to provide a novel and improved traction attachment for a pneumatic vehicle tire, said attachment being simple in construction, being very easy to apply to a tire, and being arranged so that it automatically fastens itself to the tread of the tire as the tire rotates.

A further object of the invention is to provide an improved traction attachment for a resilient vehicle tire, said attachment being inexpensive to fabricate, being durable in construction, being easy to mount on a tire, and being readily removable from the tire after its use is no longer required.

Further objects and advantages of the invention will become apparent from the following description and claims, and from the accompanying drawings, wherein:

Figure 1 is a side elevational view of a vehicle wheel and tire provided with an improved anti-skid device according to the present invention.

Figure 2 is a front elevational view of the wheel and tire of Figure 1, illustrating the forward portion of the traction device.

Figure 3 is a vertical cross sectional view taken through the traction device on the line 3—3 of Figure 2.

Figure 4 is a horizontal cross sectional view taken on the line 4—4 of Figure 3.

Figure 5 is a cross sectional view taken on the line 5—5 of Figure 3.

Referring to the drawings, the anti-skid device of the present invention is designated generally at 11 and comprises a pair of arcuate tread-engaging plate members 12, 12 adapted to be disposed on diametrically opposite spaced portions of the tread of a conventional pneumatic vehicle tire 13, the curvature of the plate members 12 conforming with the curvature of said diametrically opposite tread portions, as is clearly shown in Figure 1.

The plate members 12, 12 are formed on their inside surfaces with inwardly extending prongs 14, said prongs being of sufficient length to penetrate into the tread portion of the tire and to hold the plate members 12 against circumferential movement on the tire. As shown in Figure 3, the prongs 14 are spaced uniformly in a circumferential direction along the plate members 12, and a plurality of rows of prongs 14 are provided, for example, three rows, as shown in Figures 4 and 5.

Transversely secured on the opposite end portions of each plate member 12 are the cleat bars 15, 15, said cleat bars projecting laterally substantial distances beyond the side edges of the plate members 12 and being inwardly bent, so as to extend substantially radially of the tire 13 and to extend along the opposite side walls 16, 16 of the tire and resiliently engage same. Thus, as shown in Figure 5, the ends of the cleat members 15, shown at 17, 17 comprise resilient fingers which clampingly engage the side walls 16, 16 of the tire and exert a sufficient gripping action thereon to resist circumferential slipping of the plate members 15 prior to the embedment of the prongs 14 in the tread of the tire.

Transversely secured to the intermediate portion of each plate member 12, midway between the cleat members 15, 15 is an additional cleat member 18 formed at one side with an inwardly and substantially radially directed resilient gripping finger 19, substantially longer than the gripping fingers 17 of the cleat members 15 and likewise adapted to clampingly engage with one side wall 16 of a tire 13. Cleat member 18 is formed at its opposite end with a resilient arm 20 which is of substantial length and which extends radially, as is clearly shown in Figure 4; the arm 20 being adapted to cooperate with the opposing member 19 to exert a resilient clamping action on the side walls of a tire 13. The inner end of each arm 20 is formed with an aperture 21, and a coiled spring 22 is connected at its opposite ends to the respective apertured ends of the radially extending, opposing arms 20, 20, as shown in Figure 1, whereby the diametrically opposing plate members 12, 12 are resiliently connected together, and whereby the tension of the spring 22 exerts inward forces on the respective plate members 12, 12, serving to assist in holding the plate members on the diametrically opposite portions of the tread of a tire 13 when the apparatus is first engaged on the tire.

The spring 22 continues to exert inward forces on the arms 20, 20 during the entire time that the device is mounted on the tire, serving to prevent the plate members 12, 12 from being shaken off the tread of the tire.

In mounting the anti-skid device 11, the opposite plate members 12, 12 are engaged on diametrically opposite portions of the periphery of the tire 13 and are connected together by the coiled spring 22. Thus, one end of the coiled spring 22 is provided with a loop 23 which may be permanently secured to the apertured end of one of the arms 20, whereas the other end of the coiled spring 22 is provided with a fastening hook 24 which is engageable in the aperture 21 of the remaining arm 20.

After the plate members 12, 12 have been mounted on diametrically opposing portions of the tire tread in the manner illustrated in Figure 1, and as above described, the prong elements 14 will become embedded in the tread of the tire after a few turns of the wheel, the ground contact acting on the plate members 12 to force the prongs 14 inwardly of the tread and to cause said prongs to become embedded in the tread. As will be readily apparent, after the two opposing plate members 12, 12 have been positioned on the diametrically opposite portions of the tire tread, the spring 22 serves to retain said plate members on the tire tread, together with the gripping actions of the respective pairs of elements 19, 20 and 17, 17 exerted on the side walls of the tire.

It will be noted that the apparatus is engageable on the tire without the necessity of jacking up the wheel, and without requiring the use of any tools whatsoever.

When it is desired to remove the anti-skid device from the tire, it is merely necessary to disengage the hook 24 from the aperture 21 of its associated arm 20, releasing the spring 22, and allowing the plate members 12, 12 to be pulled away from the tire tread.

While a specific embodiment of an improved anti-skid device for a resilient vehicle tire has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. An anti-skid device for a resilient vehicle tire comprising a plurality of arcuate tread-engaging members shaped to engage on spaced portions of the tread of a tire, a plurality of traction lugs secured transversely on the outer surface of each of the members and having resilient inwardly extending end arms adapted to clampingly engage the side walls of the tire, prongs on the inner surfaces of the members penetrable into the tread of the tire, and resilient means connecting certain of the end arms and acting to urge the members against the tread of the tire.

2. An anti-skid device for a resilient vehicle tire comprising a pair of arcuate tread-engaging plate members shaped to engage on diametrically spaced portions of the tread of a tire, a plurality of transverse traction lugs secured on the outer surface of each of the members and having resilient inwardly extending end arms adapted to clampingly engage the side walls of the tire, inwardly directed prongs on the inner surfaces of the members penetrable into the tread of the tire, and resilient means connecting a pair of opposing end arms and acting to urge the plate members against the tread of the tire.

3. An anti-skid device for a resilient vehicle tire comprising a pair of arcuate tread-engaging plate members shaped to engage on diametrically spaced portions of the tread of a tire, a plurality of transverse traction lugs secured on the outer surfaces of each of the plate members and having resilient inwardly extending end arms adapted to clampingly engage the side walls of the tire, inwardly directed prongs on the inner surfaces of the plate members penetrable into the tread of the tire, one of the end arms on each plate member being elongated inwardly and extending radially from the outer side margin of the intermediate portion of the plate member, and a coiled spring connecting the inner ends of the elongated arms and acting to urge the plate members against the tread of the tire.

References Cited in the file of this patent
UNITED STATES PATENTS

| | | |
|---|---|---|
| 2,696,237 | Doughty | Dec. 7, 1954 |
| 2,808,868 | Bryan | Oct. 8, 1957 |